US012568170B2

(12) United States Patent
Dizengof et al.

(10) Patent No.: US 12,568,170 B2
(45) Date of Patent: **\*Mar. 3, 2026**

(54) PRIORITIZING EMERGENCY CALLS BASED ON CALLER RESPONSE TO AUTOMATED QUERY

(71) Applicant: Carbyne Ltd., Tel-Aviv (IL)

(72) Inventors: Alexander Dizengof, New York, NY (US); Roman Malih, New York, NY (US); Alex Gruber, New York, NY (US)

(73) Assignee: Carbyne Ltd., Tel-Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 19/220,169

(22) Filed: May 28, 2025

(65) Prior Publication Data

US 2025/0286953 A1     Sep. 11, 2025

Related U.S. Application Data

(63) Continuation-in-part of application No. PCT/IL2024/050729, filed on Jul. 24, 2024, which is
(Continued)

(51) Int. Cl.
H04M 3/51 (2006.01)
H04M 3/42 (2006.01)
(52) U.S. Cl.
CPC ..... H04M 3/5116 (2013.01); H04M 3/42357 (2013.01)
(58) Field of Classification Search
CPC ........................ H04M 3/5116; H04M 3/42357
See application file for complete search history.

(56) References Cited

U.S. PATENT DOCUMENTS 6,754,335 B1     6/2004 Shaffer et al.
8,976,939 B1     3/2015 Hamilton et al.
(Continued)

FOREIGN PATENT DOCUMENTS

JP          7292824      6/2023
WO      WO 01/82580      11/2001

OTHER PUBLICATIONS

International Search Report and the Written Opinion Dated Sep. 30, 2024 From the International Searching Authority Re. Application No. PCT/IL2024/050729. (14 Pages).
(Continued)

*Primary Examiner* — Stella L. Woo

(57) ABSTRACT

Incoming emergency calls prioritization, comprising receiving one or more emergency calls originating from one or more client devices used to report one or more emergency events, computing an event zone for each emergency event based on one or more event attributes of the emergency event retrieved according to data extracted from the emergency call, receiving one or more subsequent emergency calls originating from one or more another client devices, computing spatiotemporal metrics including a location of each another client device with respect to the event zone of one or more of the emergency events and/or a timing of each subsequent emergency call with respect to the one or more emergency calls, responding to the subsequent emergency calls with one or more queries generated automatically according to the spatiotemporal metrics, and prioritizing the subsequent emergency calls according to a response to the to the query(s) via the another client devices.

21 Claims, 4 Drawing Sheets

Related U.S. Application Data a continuation of application No. 18/237,416, filed on Aug. 24, 2023.

(56) References Cited

U.S. PATENT DOCUMENTS

|  |  |  |  |
|---|---|---|---|
| 9,420,116 | B1 | 8/2016 | Hamilton et al. |
| 10,212,281 | B2 | 2/2019 | Czachor, Jr. et al. |
| 10,362,168 | B1 | 7/2019 | Pitta Eswara Chandra et al. |
| 10,743,168 | B1* | 8/2020 | Erenel ................... H04W 76/50 |
| 11,375,063 | B1* | 6/2022 | Frenkel ............... H04M 3/5166 |
| 2009/0284348 | A1* | 11/2009 | Pfeffer ................. G08B 25/006 |
|  |  |  | 340/7.3 |
| 2015/0111526 | A1* | 4/2015 | Fletcher ................ H04W 4/021 |
|  |  |  | 455/404.2 |
| 2017/0061761 | A1* | 3/2017 | Kolla ................. G08B 21/0261 |
| 2018/0189913 | A1* | 7/2018 | Knopp ................. H04W 4/021 |
| 2018/0288224 | A1 | 10/2018 | Dizengof et al. |
| 2019/0149661 | A1 | 5/2019 | Klaban |
| 2019/0385711 | A1* | 12/2019 | Shriberg ................ G16H 15/00 |
| 2020/0068025 | A1* | 2/2020 | Duran ..................... H04L 63/10 |
| 2020/0118431 | A1* | 4/2020 | Amacker .............. G08G 1/094 |
| 2021/0200424 | A1* | 7/2021 | Therrien .............. G06F 3/0488 |
| 2022/0007165 | A1 | 1/2022 | Ekl |
| 2022/0337702 | A1* | 10/2022 | Smetek .............. H04M 3/5166 |
| 2022/0377522 | A1* | 11/2022 | Martin .................. H04W 4/029 |
| 2023/0395204 | A1* | 12/2023 | Mitjans .................. G16H 50/20 |
| 2024/0412856 | A1 | 12/2024 | Mensch et al. |
| 2025/0071205 | A1* | 2/2025 | Dizengof .......... H04M 3/42348 |

OTHER PUBLICATIONS

Official Action Dated May 23, 2025 from the US Patent and Trademark Office Re. U.S. Appl. No. 18/237,416. (16 pages).

Alfalqi et al. "An Emergency Event Detection Ensemble Model Based on Big Data", Big Data and Cognitive Computing, 6(2): 42-1-42-18, Apr. 16, 2022.

Official Action Dated Oct. 8, 2025 from the US Patent and Trademark Office Re. U.S. Appl. No. 18/237,416. (18 pages).

* cited by examiner

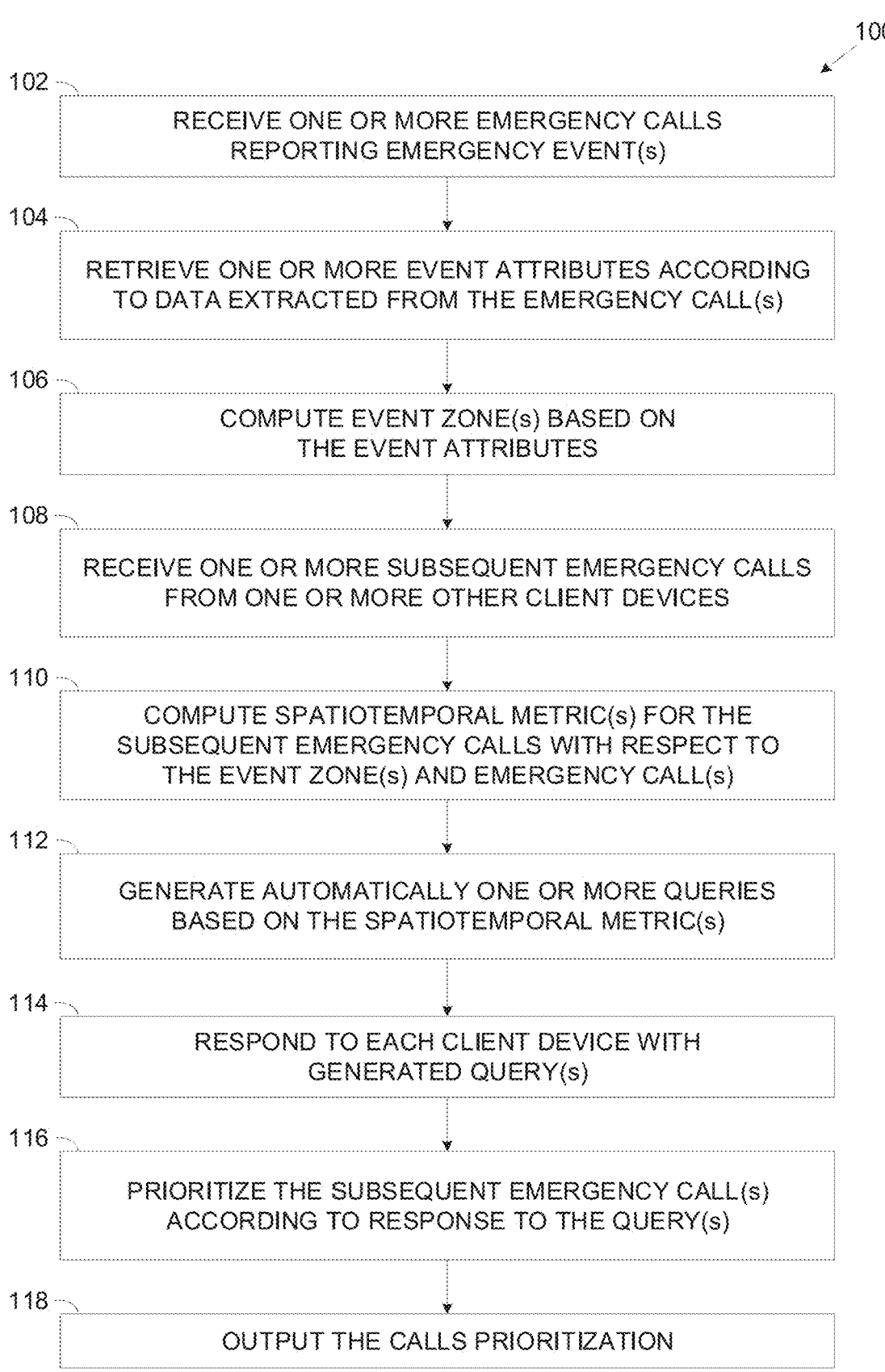

100

102 — RECEIVE ONE OR MORE EMERGENCY CALLS REPORTING EMERGENCY EVENT(s)

104 — RETRIEVE ONE OR MORE EVENT ATTRIBUTES ACCORDING TO DATA EXTRACTED FROM THE EMERGENCY CALL(s)

106 — COMPUTE EVENT ZONE(s) BASED ON THE EVENT ATTRIBUTES

108 — RECEIVE ONE OR MORE SUBSEQUENT EMERGENCY CALLS FROM ONE OR MORE OTHER CLIENT DEVICES

110 — COMPUTE SPATIOTEMPORAL METRIC(s) FOR THE SUBSEQUENT EMERGENCY CALLS WITH RESPECT TO THE EVENT ZONE(s) AND EMERGENCY CALL(s)

112 — GENERATE AUTOMATICALLY ONE OR MORE QUERIES BASED ON THE SPATIOTEMPORAL METRIC(s)

114 — RESPOND TO EACH CLIENT DEVICE WITH GENERATED QUERY(s)

116 — PRIORITIZE THE SUBSEQUENT EMERGENCY CALL(s) ACCORDING TO RESPONSE TO THE QUERY(s)

118 — OUTPUT THE CALLS PRIORITIZATION

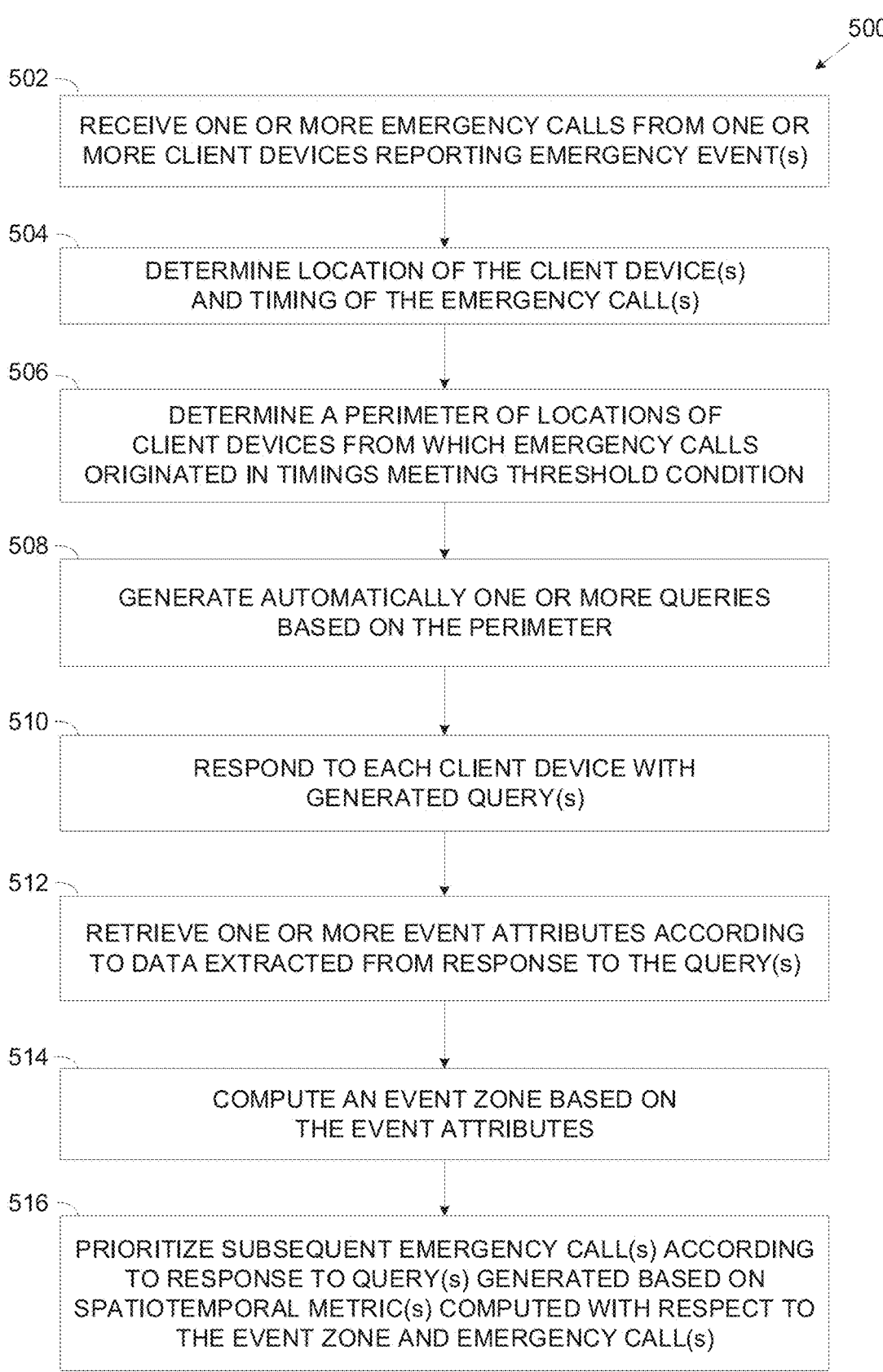

500

502 — RECEIVE ONE OR MORE EMERGENCY CALLS FROM ONE OR MORE CLIENT DEVICES REPORTING EMERGENCY EVENT(s)

504 — DETERMINE LOCATION OF THE CLIENT DEVICE(s) AND TIMING OF THE EMERGENCY CALL(s)

506 — DETERMINE A PERIMETER OF LOCATIONS OF CLIENT DEVICES FROM WHICH EMERGENCY CALLS ORIGINATED IN TIMINGS MEETING THRESHOLD CONDITION

508 — GENERATE AUTOMATICALLY ONE OR MORE QUERIES BASED ON THE PERIMETER

510 — RESPOND TO EACH CLIENT DEVICE WITH GENERATED QUERY(s)

512 — RETRIEVE ONE OR MORE EVENT ATTRIBUTES ACCORDING TO DATA EXTRACTED FROM RESPONSE TO THE QUERY(s)

514 — COMPUTE AN EVENT ZONE BASED ON THE EVENT ATTRIBUTES

516 — PRIORITIZE SUBSEQUENT EMERGENCY CALL(s) ACCORDING TO RESPONSE TO QUERY(s) GENERATED BASED ON SPATIOTEMPORAL METRIC(s) COMPUTED WITH RESPECT TO THE EVENT ZONE AND EMERGENCY CALL(s)

FIG. 5

PRIORITIZING EMERGENCY CALLS BASED ON CALLER RESPONSE TO AUTOMATED QUERY

RELATED APPLICATIONS

This application is a Continuation-in-Part (CIP) of PCT Patent Application No. PCT/IL2024/050729 having International filing date of Jul. 24, 2024, which is a Continuation of U.S. patent application Ser. No. 18/237,416, filed on Aug. 24, 2023. The contents of the above applications are all incorporated by reference as if fully set forth herein in their entirety.

BACKGROUND

Some embodiments relate to prioritizing incoming emergency calls, and, more specifically, but not exclusively, to prioritizing incoming emergency calls according to response to queries generated automatically based on spatiotemporal data.

Short response time is obviously one of the most essential factors for efficient handling of emergency events.

A major key aspect which may affect the response time is the ability of emergency call centers, for example, Public Safety Answering Points (PSAP), police dispatch centers, medical services dispatch centers, fire department dispatch centers and/or the like to quickly accept, evaluate and respond to incoming emergency calls received from reporters of emergency events.

The despatchers at such emergency call centers, whether human or automated, may be highly trained and capable to briefly interrogate the reporters and asses the emergency events to decide on a course of action, a response type, an emergency service(s) to be alerted and/or the like.

However, no matter how efficient the dispatchers may be, the response time to accepting and handling the incoming emergency calls may often be significantly high due to the limited number of dispatchers available to accept the emergency calls and serve a massive volume of incoming emergency calls.

SUMMARY

According to a first aspect of the disclosed subject matter there is provided a computer implemented method of prioritizing incoming emergency calls, comprising:

Receiving one or more emergency calls originating from one or more client devices used to report one or more emergency events.

Computing one or more event zones for the one or more emergency events based on one or more event attributes of the one or more emergency events retrieved according to data extracted from the one or more emergency calls.

Receiving one or more subsequent emergency calls originating from one or more another client devices.

Computing one or more spatiotemporal metrics for the one or more subsequent emergency calls selected from the group consisting of:

a location of the one or more another client devices with respect to the event zone of the one or more emergency events, and a timing of the one or more subsequent emergency calls with respect to the one or more emergency calls.

Responding to the one or more subsequent emergency calls with one or more queries generated automatically according to the one or more spatiotemporal metrics.

Prioritizing the one or more subsequent emergency calls according to a response received via the one or more another client devices to the one or more queries.

According to a second aspect of the disclosed subject matter there is provided a system for prioritizing incoming emergency calls, comprising one or more processors configured to execute a code. The code comprising:

Code instructions to receive one or more emergency calls originating from one or more client devices used to report one or more emergency events.

Code instructions to compute one or more event zones for the one or more emergency events based on one or more event attributes of the one or more emergency events retrieved according to data extracted from the one or more emergency calls.

Code instructions to receive one or more subsequent emergency calls originating from one or more another client devices.

Code instructions to compute one or more spatiotemporal metrics for the one or more subsequent emergency calls selected from the group consisting of:

a location of the one or more another client devices with respect to the event zone of the one or more emergency event, and a timing of the one or more subsequent emergency calls with respect to the one or more emergency calls.

Code instructions to respond to the one or more subsequent emergency calls with one or more queries generated automatically according to the one or more spatiotemporal metrics.

Code instructions to prioritize the one or more subsequent emergency calls according to a response received via the one or more another client devices to the one or more queries.

In an optional implementation form of the first, and/or second aspects, a location of the one or more client devices and a timing of the one or more emergency calls are determined, a perimeter of the location of one or more client devices for which the timing of one or more emergency calls that originated therefrom meets a threshold condition is determined, and the one or more event zones are computed according to the perimeter.

In an optional implementation form of the first, and/or second aspects, are responded to with one or more another queries generated automatically according to the perimeter, and the one or more event attributes are retrieved and/or the perimeter is adjusted according to a response received via the one or more client devices to the one or more another queries.

In an optional implementation form of the first, and/or second aspects, the one or more subsequent emergency calls in the call queue are responded to by one or more virtual agents.

In an optional implementation form of the first, and/or second aspects, the emergency calls are automatically transcribed in real time and one or more machine learning models are applied on the transcription of the emergency calls to retrieve and cast emergency event information and/or caller identification into a structured format.

In an optional implementation form of the first, and/or second aspects, one or more audio augmentation techniques are applied to the emergency calls.

In an optional implementation form of the first, and/or second aspects, an interaction flow of the one or more subsequent emergency calls comprising the one or more queries and the response received thereto via the one or more client devices is analyzed for extracting one or more another event attributes of the one or more emergency events, and responsive to a call taker answering the one or more subsequent emergency calls the call taker is provided with one or more another event attributes.

In an optional implementation form of the first, and/or second aspects, the at least one event zone is dynamically adjusted according to one or more event attributes retrieved according to data extracted from the one or more subsequent emergency calls.

In an optional implementation form of the first, and/or second aspects, the at least one event zone of one or more of the emergency events is adjusted according to one or more physical features identified at and/or in proximity to the respective event zone.

In an optional implementation form of the first, and/or second aspects, the at least one event zone of one or more of the emergency events is adjusted according to one or more environmental conditions.

In an optional implementation form of the first, and/or second aspects, the at least one event zone of one or more of the emergency events is adjusted according to one or more timing parameters.

In an optional implementation form of the first, and/or second aspects, the at least one event zone of one or more of the emergency events is adjusted according to one or more unrelated events and/or activities identified in proximity to a location of the respective event zone.

In an optional implementation form of the first, and/or second aspects, one or more of the queries are adjusted based on the one or more event attributes of the one or more emergency events.

In an optional implementation form of the first, and/or second aspects, one or more generative machine learning models are used for generating one or more of the queries.

In an optional implementation form of the first, and/or second aspects, the one or more subsequent emergency calls are prioritized according to one or more call attributes responsive to failure to receive a verbal response during a predefined time period.

In a further implementation form of the first, and/or second aspects, the prioritization of the subsequent emergency calls is conducted using one or more trained machine learning models.

In a further implementation form of the first, and/or second aspects, the one or more trained machine learning models are further trained to filter out false positive emergency calls irrelevant to the one or more emergency events.

In an optional implementation form of the first, and/or second aspects, a plurality of machine learning models are used for prioritizing the subsequent emergency call. Each of the plurality of machine learning models is trained for prioritizing emergency calls relating to a respective one of a plurality of emergency events.

In an optional implementation form of the first, and/or second aspects, a graphical user interface (GUI) presented on a display of one or more call center terminals is adjusted according to the prioritization.

In a further implementation form of the first, and/or second aspects, each of the one or more emergency calls and/or the one or more subsequent emergency calls is initiated by a user or an automated device.

In a further implementation form of the first, and/or second aspects, emergency calls from automated devices are automatically handled by at least one virtual agent.

In a further implementation form of the first, and/or second aspects, the one or more event attributes are stored in an event log created for the one or more emergency events based on the one or more emergency calls.

In an optional implementation form of the first, and/or second aspects, the event log is updated based on one or more of the subsequent emergency calls.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS in Some embodiments are herein described, by way of example only, with reference to the accompanying drawings. With specific reference now to the drawings in detail, it is stressed that the particulars are shown by way of example and for purposes of illustrative discussion of embodiments. In this regard, the description taken with the drawings makes apparent to those skilled in the art how embodiments may be practiced.

In the drawings:

FIG. 1 is a flowchart of an exemplary process of prioritizing incoming emergency calls according to response to queries generated automatically based on spatiotemporal data including relative location to emergency event zone, according to some embodiments;

Figures 3, 4:
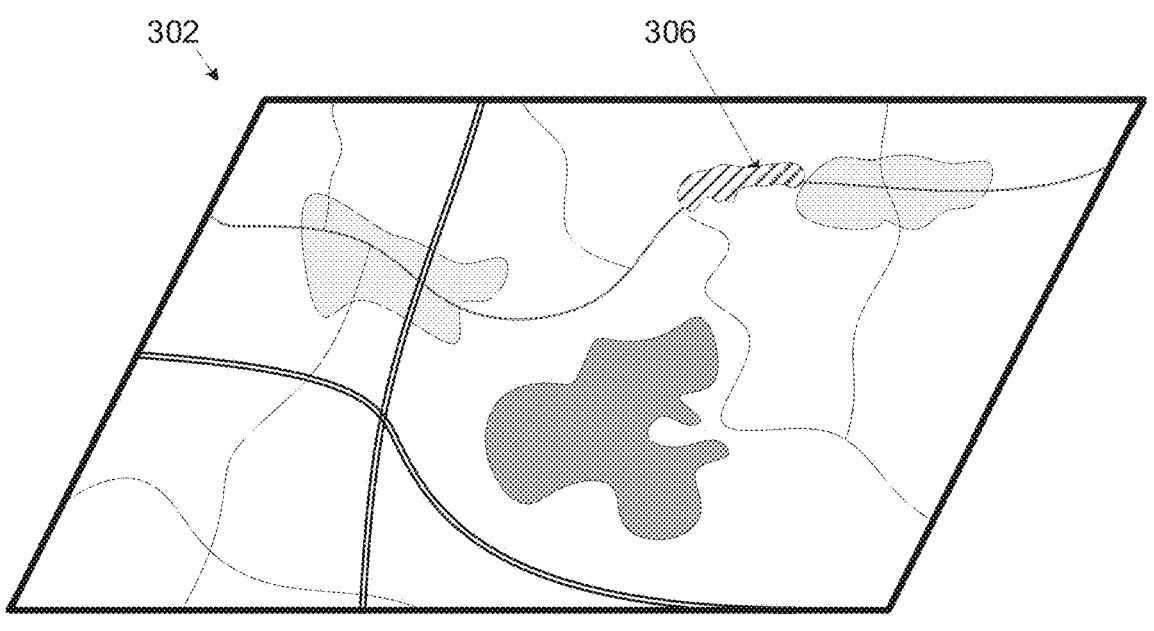
FIG. 3 is a schematic illustration of an exemplary emergency event zone computed based on event attributes extracted from one or more emergency calls, according to some embodiments.

FIG. 4 is a schematic illustration of an exemplary emergency event zone dynamically adjusted based on event attributes extracted from one or more subsequent emergency calls, according to some embodiments; and FIG. 5 is a flowchart of another exemplary process of prioritizing incoming emergency calls according to response to queries generated automatically based on spatiotemporal data, according to some embodiments.

DETAILED DESCRIPTION

The present invention, in some embodiments thereof, relates to prioritizing incoming emergency calls, and, more specifically, but not exclusively, to prioritizing incoming emergency calls according to response to queries generated automatically based on spatiotemporal data, according to some embodiments.

According to some embodiments, there are provided methods, systems, devices and computer program products for prioritizing incoming emergency calls initiated to report one or more emergency events received at one or more call enters, for example, a PSAP, a dispatch center, and/or the like. The emergency calls may be queued and/or ordered according to their priority and forwarded accordingly for handling by one or more human and/or dispatchers.

In particular, subsequent incoming emergency calls received at the call center, which may potentially relate to one or more emergency events already reported by one or more previous emergency calls, may be prioritized and optionally filtered. This may enable efficient and reduced response time for handling and serving high priority incoming emergency calls while postponing handling of lower priority calls or even filtering out and terminating emergency calls which are estimated, predicted, and/or determined to be irrelevant, redundant, and/or useless for providing additional useful information regarding the emergency event. The prioritization and/or filtering out of calls is also referred to herein throughout the present disclosure as "triage".

Responsive to receiving, at the call center, one or more (first) emergency calls reporting an emergency event which was not previously reported, an emergency event zone may be computed for the emergency event. The emergency zone may be expressed, for example, by a polygon computed based on one or more event attributes retrieved according data extracted from the incoming emergency call(s) to define an estimated perimeter and/or a boundary of the emergency event site.

The event attributes may comprise at least a location of client device(s) (e.g., phone, tablet, wearable device, vehicular device, etc.) used to initiate the emergency call(s) and may further include one or more additional attributes, for example, an emergency type (e.g., fire, car accident, violence incident, medical incident, etc.), injuries and/or casualties, arrival and/or access directions, details of emergency units already present at the scene, and/or the like.

Optionally, the event zone of one or more emergency events may be adjusted according to one or more physical features identified at and/or in proximity to the event zone, for example, geographical, terrestrial, surface, structural, vegetation, artificial and/or natural landmark parameters, attributes and/or characteristics, and/or the like which are estimated to affect the emergency event and/or handling it.

Optionally, the event zone of one or more emergency events may be adjusted according to one or more environmental conditions identified at the reported location of the emergency event, for example, rain, snow, fog, extreme heat, and/or the like which are estimated to affect the emergency event and/or handling it.

Optionally, the event zone of one or more emergency events may be adjusted according to one or more timing parameters applicable at the time of the emergency event and estimated to affect the emergency event and/or handling it.

Optionally, the event zone of one or more emergency events may be adjusted according to one or more unrelated events and/or activities identified in proximity to a location of the event zone, for example, a public gathering of people, a close by facility, and/or the like, estimated to affect the emergency event and/or handling it.

After one or more emergency events are reported, by the first emergency calls, one or more subsequent emergency calls may be received at the call center which may potentially relate to one or more of already reported emergency events.

One or more such subsequent emergency calls which are initiated to report previously reported emergency event(s) may be irrelevant, redundant, and/or useless to provide additional information regarding the emergency event(s) which is not already known and available to the call center.

The subsequent emergency calls may be therefore prioritized according to their estimated benefit and contribution to providing new useful information regarding the previously reported emergency events. Optionally, one or more of the subsequent emergency calls which are estimated to be irrelevant, redundant, and/or useless may be filtered out and discarded (terminated).

Specifically, the subsequent emergency calls initiated using respective client devices may be prioritized according to responses of their initiators (users) to one or more queries generated automatically based on the relative location of the initiating client devices with respect to the event zone computed for the previously reported emergency event(s).

The queries may be automatically generated to incite the users (reports) to respond with information which may be beneficial to better understand the emergency event(s), their characteristics, attributes, and/or the like which may increase efficiency of handling these emergency events either by the dispatchers at the call center and/or by emergency teams dispatched to respond to the emergency event.

The responses received from the users may be analyzed automatically and the corresponding subsequent emergency calls may be prioritized according to the content of the responses, in particular according to event attributes extracted from the responses such that valuable subsequent emergency calls may be assigned high priority while less valuable subsequent emergency calls may be assigned low priority or even filtered out and terminated.

The prioritization, for example, a queue ordering the subsequent emergency calls according to their priority may be output and used to route the subsequent emergency calls to dispatchers at the call center according to their priority.

Optionally, the emergency zone computed for one or more emergency events may be dynamically adjusted and updated in real-time according to one or more event attributes extracted from one or more subsequent emergency calls relating to the respective emergency event which was already reported and assigned with a respective event zone.

Multiple reported emergency events in vicinity of one another occurring concurrently or substantially at a same time frame may give rise to an overlap between respective event zones computed for each, such that incoming emergency call(s) may potentially be relevant to either one of and/or both events with two overlapping zones. Temporal and/or spatial proximity call data may be leveraged to classify the incoming emergency call(s) to respective event zone(s), for example, in accordance with proximity of call timing(s) and/or calling device(s)' location(s) relative to reference and/or representative points, benchmarks, and/or the like, whether in time and/or in space, each of which may be referred to as an "event center" of a respective emergency event. To vit, an emergency event and its event zone may be selected as the one to which the incoming call pertains based on temporal proximity (how recent it is) and/or spatial proximity (how close it is) to the center of the event at hand.

Call timing and/or location data may be leveraged in facilitating and streamlining automatic prioritization of emergency calls even prior to any emergency events being reported and emergency zones computed for each. In cases where call metrics (e.g. rate increase, sudden spike or surge of calls, and/or the like) indicate multiple calls from a same perimeter location, an event zone may be computed with a perimeter based on locations of devices from which those calls originate, and queries may be automatically generated to solicit from callers further required information on the emergency event at hand, i.e., what is the nature and/or type of the event, where it is located, and/or other additional attributes. The information extracted from responses of the callers to the queries may be used to update a respective emergency event and/or its event zone, such that subsequent emergency calls in the perimeter of the event may be prioritized accordingly.

Virtual agents, such as chatbots and/or likewise machine based conversational partners for textual and/or spoken communications, may be leveraged to answer waiting incoming calls that may be queued in line for handling by human dispatcher and/or call center personnel. The virtual agents may be used to automatically generate queries for questioning and gathering information from the callers (e.g., location, type of event, urgency, etc.), which may then be utilized accordingly, e.g., to create new emergency event entries and compute for each an event zone, to prioritize and/or filter out calls, to adjust event zones computed for previously reported events, and/or the like.

Active calls with call takers may be automatically transcribed, and the call transcriptions may be automatically analyzed in real time, optionally using Artificial Intelligence (AI) tools, Large Language Models (LLMs), and/or the like, to categorize the calls (e.g., high or low priority call), identify events and/or pertaining information (i.e., event type, location, additional attributes), and/or the like. By automatically transcribing active calls and processing the call transcriptions in real time, so as to identify and/or create events, categorize calls, and/or the like, triage of calls may be expedited.

Audio augmentation techniques such as noise reduction, speaker diarization, cross call sound correlation, and/or the like may be leveraged to process and/or condition sound signals of calls to allow for better understanding and decoding of caller speech and/or background occurrences. As massive events may have a lot going around, e.g., people screaming, ambulances in the background, etc., call augmentation for noise reduction and/or improved information extraction may further streamline the identification and/or creation of events and the triaging of calls accordingly.

Emergency calls initiated by automated devices may be received at the call center, for example, from alarm systems, mobile devices such as smartphones, wearable devices such as smartwatches, emergency buttons, cars, and/or the like. Such automated devices may be configured to automatically initiate an emergency call upon detection of a triggering event (e.g., fall detection by smartwatches, accident detection by cars, and/or the like). Such automated calls may be handled in a dedicated route and/or by virtual agents to offload these calls from the center and/or identify potential massive events.

Call triage flow interactions consisting of queries presented to callers and responses received for those queries may be analyzed with entity recognition and summarized, e.g. using AI and/or LLM model(s), then on rerouting to the call center, the call taker may be provided with the collected information from the call triage flow (and/or information from other calls for the same event) to facilitate effective call handling.

Automatically prioritizing incoming emergency calls based on spatiotemporal data including their respective location to event zones of emergency events and/or timing relative to previous calls, and on response to queries automatically generated based on the relative location, may present significant advantages and benefits compared to current emergency calls prioritization systems and methods.

First, since there may be an extremely high number of incoming emergency calls at the call center at any given time, prioritizing the subsequent emergency calls potentially relating to previously reported emergency events and optionally filtering out redundant, useless, and/or irrelevant subsequent emergency calls, may significantly improve and reduce the response time of the dispatchers at the call center. The dispatchers may focus their attention and resources on the subsequent emergency calls estimated to provide valuable new information regarding the emergency events and may therefore get a clearer, more extensive, more accurate and/or more reliable view of the emergency event and may respond faster to dispatch appropriate emergency teams to the emergency event sites.

Moreover, computing an event zone for each emergency event may efficiently bound and reflect the actual site of the emergency event rather than just pinpointing the event as may be done by some of the existing methods. Pinpointing an emergency event may prevent efficient prioritization of subsequent emergency calls which are potentially related to the same emergency event. This is because while the event may actually be spread across a wide range and thus seen by a plurality of users (reported) reporting the emergency in a plurality of subsequent emergency calls, at least some of these calls initiated by users relatively distant from each the pinpointed spot of the event other may be regarded as reporting disparate and unrelated emergency events. Defining an event zone on the other hand which may encompass the entire emergency event site may enable efficient identification and determination of the relative location of each of the users initiating the subsequent emergency calls and prioritizing them accordingly.

Furthermore, the queries generated automatically, based on the relative location of the reporters with respect to the event zones of previously reported emergency events and/or relative timing of the subsequent calls, may be significantly more accurate, specific and/or particular compared to queries generated based on a pinpoint location of emergency events as may be done by the existing methods. This is because the event zone computed for the emergency events may reveal further details, insights, and/or observations regarding the emergency event and how the events may appear from the relative location of the users initiating the subsequent emergency calls.

As such, since the queries may be significantly more accurate, specific and/or particular, the responses to these queries may be also significantly more accurate, specific and/or particular and may be used for significantly improved prioritization and/or filtering of the subsequent emergency calls.

In addition, dynamically adjusting, in real-time, the event zone computed for one or more emergency events based on event attributes extracted from one or more subsequent emergency calls may produce an increased accuracy event zone which may be used for prioritizing further subsequent emergency calls received at the call center which may be potentially related to the same previously reported emergency event(s). This is because the automatically generated queries may be generated with increased accuracy based on the relative location of the callers (reports) of the subsequent emergency calls computed with respect to the dynamically updated emergency zone(s).

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a flowchart of an exemplary process of prioritizing incoming emergency calls according to response to queries generated automatically based on spatiotemporal data including relative location to emergency event zone, according to some embodiments.

Reference is also made to FIG. 5, which is a flowchart of another exemplary process of prioritizing incoming emergency calls according to response to queries generated automatically based on spatiotemporal data, according to some embodiments.

An exemplary process 100 and/or 500 may be executed to prioritize incoming emergency calls initiated to report one or more emergency events received at one or more call enters, for example, a PSAP, a dispatch center, and/or the like. The emergency calls may be queued and/or ordered according to their priority and forwarded accordingly for handling by one or more dispatchers.

In particular, an emergency event zone may be computed for an emergency event based on event attributes retrieved according to data extracted from one or more emergency calls. In response to one or more subsequent emergency calls initiated by respective client devices potentially with respect to the previously reported emergency event, one or more queries may be automatically generated based on a relative location of the client device(s) with respect to the event zone and the subsequent emergency call(s) may be prioritized according to a response to the query(s).

Additionally or alternatively, in response to receiving one or more emergency calls from one or more client devices, a location of each client device from which an emergency call originated, and a timing of each emergency call in which it occurred, may be determined. An emergency event zone for an emergency event potentially occurring may be computed based on a perimeter of locations of client devices from which emergency calls originated at timings that meet a threshold condition, e.g. received within few seconds from one another and/or the like. The emergency calls may be responded to with one or more queries that may be automatically generated based on the emergency event zone computed for the perimeter, and event attributes and/or adjustments to the perimeter may be retrieved according to data extracted from responses received to the one or more queries. The event attributes and/or perimeter adjustments may be used for dynamically updating the emergency event zone and/or prioritizing the calls in the queue based on received responses to one or more other queries that may be automatically generated accordingly.

Figure 2:
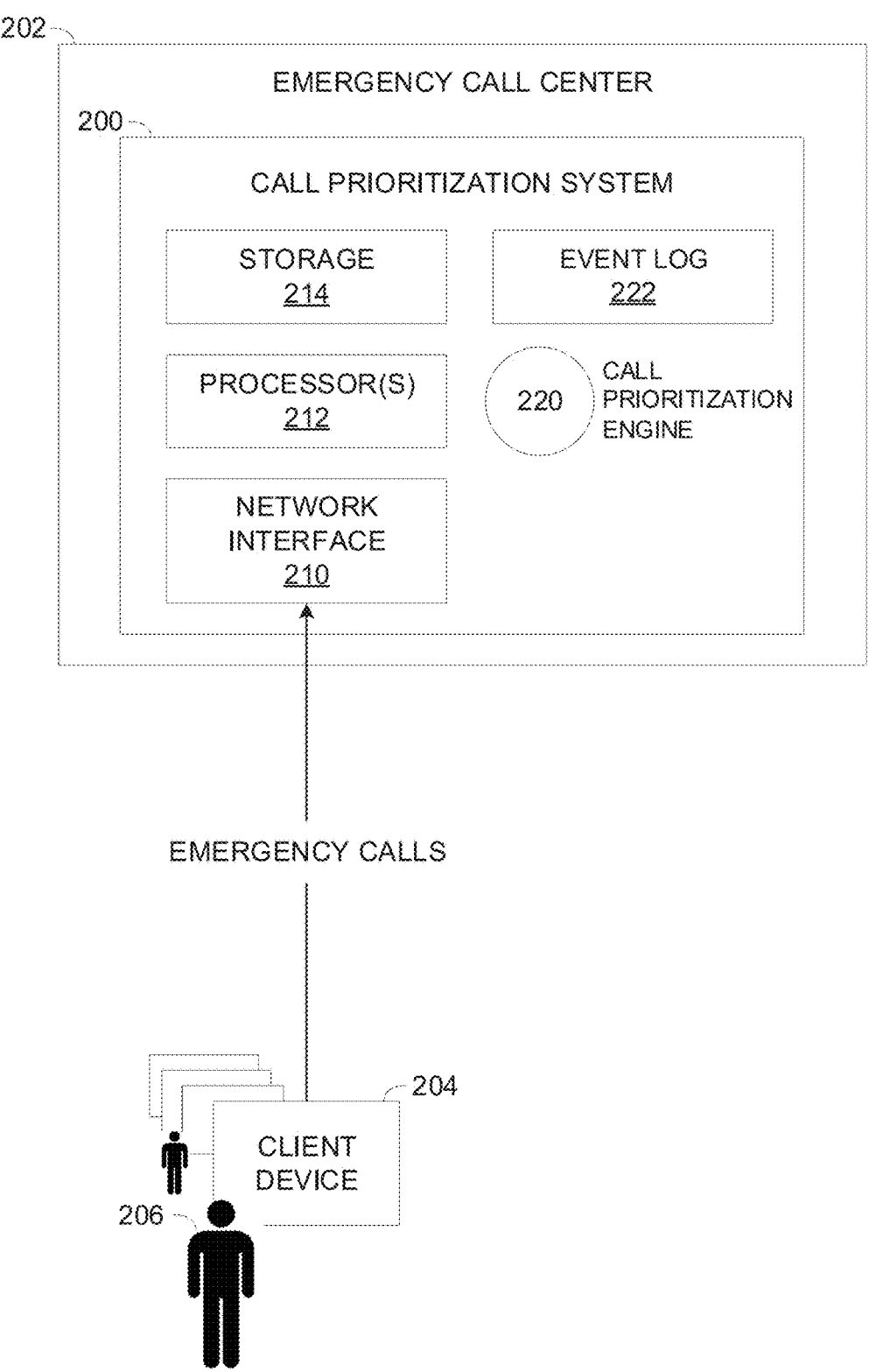
FIG. 2 is a schematic illustration of an exemplary system for prioritizing incoming emergency calls according to response to queries generated automatically based on spatiotemporal data including relative location to emergency event zone, according to some embodiments.

Reference is also made to FIG. 2, which is a schematic illustration of an exemplary system for prioritizing incoming emergency calls according to response to queries generated automatically based on spatiotemporal data including relative location to emergency event zone, according to some embodiments.

An exemplary call prioritization system 200 may be deployed in a call center, specifically an emergency call center 202 to prioritize incoming emergency calls originating from one or more client devices 204.

One or more of the client devices 204, for example, a phone, a cellular phone, a network connected wearable and/or carry-able device, and/or the like may be associated with respective users 206 who may use their client devices 204 to initiate one or more emergency calls to the emergency call center 202.

However, one or more of the client devices 204 may initiate emergency calls automatically with no human intervention. For example, the client devices 204 may include one or more devices which are typically operated by users 206, for example, a phone, a cellular phone, a network connected wearable and/or carry-able device, and/or the like which are adapted to automatically initiate emergency calls responsive to detecting, and/or estimating one or more emergency events relating to the user 206, for example, a medical condition (e.g., heart attack, a seizure, a stroke, etc.), a personal accident (fall, drop, etc.), and/or the like. In another example, the client devices 204 may include one or more vehicular network connected devices, systems, and/or units deployed in one or more vehicles and adapted to automatically initiate emergency calls responsive to detecting, and/or estimating one or more emergency events relating to the vehicle and/or to one or more of the vehicle's passengers. In another example, the client devices 204 may include one or more network connected devices, systems, and/or units of one or more monitoring stations adapted to initiate emergency calls automatically responsive to detecting one or more emergency events, for example, forest fires, car accidents, nature emergency events (e.g., earthquake, tsunami, tornado, etc.), and/or the like.

Moreover, one or more client devices 204 associated with respective users 206 may automatically initiate one or more emergency calls (e.g., SOS call) responsive to detecting, and/or estimating one or more emergency events relating to their associated user 206 and/or a companion of the user 206, for example, a medical condition (e.g., heart attack, seizure, etc.), an accident (e.g., a car accident, drowning, a fall, etc.), a violence incident, a hazard and/or danger (e.g., earthquake, blizzard, etc.), and/or the like.

The call prioritization system 200, for example, a server, a computing node, a cluster of computing nodes and/or the like may include a network interface 210, processor(s) 212, a storage 214 for storing data and/or code (program store), and/or the like.

The network interface 210 may comprise one or more wired and/or wireless interfaces, ports, and/or links, implemented in hardware, software, and/or combination thereof, for connecting to one or more communication networks, infrastructures, and/or services, for example, a Local Area Network (LAN), a Wide Area Network (WAN), a Municipal Area Network (MAN), a cellular network, the internet, a Public Switched Telephone Networks (PSTN), and/or the like.

Via the network interface 210, the call prioritization system 200 may receive a plurality of emergency calls initiated from a plurality of client devices 204. Moreover, via the network interface 210, the call prioritization system 200 may further communicate with one or more networked resources, for example, an Advance Mobile Location (AML) service, a phone service subscribers database, and/or the like.

The processor(s) 212, homogenous or heterogeneous, may include one or more processing nodes arranged for parallel processing, as clusters and/or as one or more multi core processor(s).

The storage 214 may include one or more non-transitory memory devices, for example, persistent devices such as, for example, a ROM, a Flash array, a hard drive, an SSD, a magnetic disk and/or the like, and/or volatile devices such as, for example, a RAM device, a cache memory and/or the like. The storage 214 may further comprise one or more local and/or remote network storage resources, for example, a storage server, a Network Attached Storage (NAS), a network drive, a cloud storage service and/or the like accessible via the network interface 210.

The processor(s) 212 may execute one or more software modules, for example, a process, a script, an application, an agent, a utility, a tool, an Operating System (OS), a service, a plug-in, an add-on, and/or the like each comprising a plurality of program instructions stored in a non-transitory medium (program store) such as the storage 214 and executed by one or more processors such as the processor(s) 212.

Optionally, the processor(s) 212 further include, utilize and/or apply one or more hardware elements available to the call prioritization system 200, for example, a circuit, a component, an Integrated Circuit (IC), an Application Specific Integrated Circuit (ASIC), a Field Programmable Gate Array (FPGA), a Digital Signals Processor (DSP), a Graphic Processing Unit (GPU), an Artificial Intelligence (AI) accelerator, and/or the like.

The processor(s) 212 may therefore execute one or more functional modules utilized by one or more software modules, one or more of the hardware modules and/or a combination thereof. For example, the processor(s) 212 may execute a call prioritization engine 220 adapted for executing the process 100 and/or 500.

The call prioritization system 200 may store one or more data records, for example, a file, a list, a table, a database, and/or the like, for example, in the storage 214 for storing data relating to one or more emergency events, one or more emergency calls, and/or the like. For example, the call prioritization system 200 may store an event log 222 which may be used by the call prioritization engine 220 for executing the process 100 and/or 500 and prioritize a plurality of incoming emergency calls originating from a plurality of client devices 204 to report one or more emergency events.

For brevity, the process 100 and/or 500 is described herein after for automatically prioritizing a plurality of emergency calls received from a plurality of client devices 204 operated to report a single emergency event. This, however, should not be construed as limiting since the process 100 and/or 500 may be repeated, duplicated, and/or scaled to support multiple, optionally concurrent, emergency events.

Moreover, also for brevity, the process 100 and/or 500 is described for automatically prioritizing a plurality of emergency calls received at a single call center 202. This also should not be construed to be limiting since the process 100 and/or 500 may be repeated, duplicated, and/or scaled to support multiple call centers 202 each adapted to receive a plurality of emergency calls initiated to report one or more emergency events.

As shown at 102, the process 100 starts with the call prioritization engine 220 receiving one or more emergency calls originating from one or more client devices 204 used to report an emergency event. In particular, the call prioritization engine 220 receives and handles the incoming emergency calls automatically with no human intervention.

As stated herein before, one or more emergency calls may be initiated by one or more users 206 using their respective client devices 204, for example, phone, cellular phone, smartphone, network connected wearable device (e.g., smart watch, etc.), and/or the like to report the emergency event. However, one or more emergency events may be initiated automatically by one or more automated systems adapted to use one or more associated client devices 204 to initiate emergency calls.

As shown at 104, the call prioritization engine 220 may retrieve one or more event attributes of the emergency event according to data extracted from one or more of the incoming emergency calls reporting the emergency event.

The event attributes used for computing the event zone may include at least a location of the emergency event. The call prioritization engine 220 may apply one or more methods, techniques and/or algorithms to determine the location of the reported emergency event.

For example, the call prioritization engine 220 may analyze one or more of the received emergency calls, for example, using speech analysis, Natural Language Processing (NLP), and/or the like to determine the location based on words spoken by one or more users 206 using their client device(s) 204 to report the emergency event.

In another example, the call prioritization engine 220 may receive location information of one or more of the client devices 204 used to report the emergency event, for example, a geolocation of the client device 204. The client device(s) 204 may transmit their location using one or more mobile device location protocols, and/or services, as known in the art, for example, Advance Mobile Location (AML), and/or the like. The client device(s) 204 may determine its location, for example, using one or more geolocation sensors, for example, a Global Positioning System (GPS) sensor, and/or the like.

In another example, the call prioritization engine 220 may determine and/or compute the location of one or more of the reporting client device(s) 204 based on triangulation according to interception of cellular signals transmitted by the client device 204 at multiple cellular base stations.

In another example, the call prioritization engine 220 may determine and/or estimate the location of one or more of the reporting client device(s) 204 based on analysis of media captured by the client device 204, for example, one or more images, a video sequence (clip), an audio recording, and/or the like. For example, the call prioritization engine 220 may receive one or more images captured by one or more image sensors of a reporting client device 204 and may analyze the image(s), using one or more image analysis algorithms, in attempt to identify one or more landmarks (natural and/or artificial), street signs, road signs, and/or the like which may indicate the location of the reporting client device 204. It should be noted that media transfer protocols, and/or methods used by the client device 204 and image analysis algorithms are known in the art and are out of scope of the present disclosure.

The event attributes may further include one or more additional attributes, for example, the event attributes may include a type of the emergency event, for example, a fire, a car accident, a terror attack, a violence incident, a criminal's runaway, and/or the like. In another example, the event attributes may further include a sub-type of the emergency event. For example, for a fire emergency event (event type is fire), one or more event attributes of the fire emergency event may define an event sub-type, for example, a structure fire, a wildfire, a vehicle fire, and/or the like.

In another example, the event attributes may include a description of the emergency event. For example, a description of a car accident may comprise, for example, a description of the involved vehicles, a number of involved vehicles, a description of the location, description of topography, indication of obstacles (e.g., oil on road, blocked lanes, etc.), and/or the like.

In another example, the event attributes may include indication of an injuries and/or casualties, for example, a number of injured people, a condition of injured people, injury type, severity of injuries, and/or the like. In another example, the event attributes may include arrival and/or access directions, for example, indicating a certain access road is blocked, indicating to a certain elevator in a building should be used, and/or the like. In another example, the event attributes may include details of emergency units already present at the scene, i.e., at the emergency event location, for example, police, medical teams, fire fighters, public order teams, and/or the like.

The call prioritization engine 220 may apply one or more methods, techniques and/or algorithms to retrieve the event attributes according to data extricated from the incoming emergency call(s). For example, the call prioritization engine 220 may apply speech analysis, NLP, and/or the like to analyze one or more of the received emergency calls and determine one or more event attributes based on words spoken by the user(s) 206. In another example, the call prioritization engine 220 may determine and/or estimate one or more event attributes based on analysis of the media captured by the client device 204. For example, based on image analysis of one or more images received from one or more reporting client devices 204, the call prioritization engine 220 may identify one or more event attributes for example, a type of the emergency event, a perimeter of the emergency event, injuries, casualties, presence of dispatched emergency units, and/or the like. In another example, the call prioritization engine 220 may create a numbered menu listing optional values for one or more of the event attributes, for example, an event type, which may be presented to one or more of the reporting users 206 (e.g., 1-fire, 2-violence incident, 3-car accident, etc.) such that they may press the keypad key marked with a number of an event type corresponding to the reported emergency event.

Optionally, an event log (record) is created for each emergency event, for example, by the call prioritization engine 220, for storing the event attributes relating to the emergency event which are retrieved according to the data extracted from the emergency call(s). The event log storing the related event attributes may comprise one or more records, for example, a file, a database entry, a list, a table, and/or the like which may be stored locally, for example, in storage 214, and/or remotely, for example, in one or more networked systems, services, and/or databases accessible to the call prioritization engine 220 over one or more networks via the I/O interface 210.

Optionally, the call prioritization engine 220 may communicate and/or interact with one or more Computer Aided Dispatch (CAD) applications used at the call center 202 to store one or more records relating to the emergency event which may comprise one or more event attributes of the emergency event. The call prioritization engine 220 may connect to the CAD through one or more channels, interfaces and/or the like. For example, the call prioritization engine 220 may connect to the CAD via a Structured Query Language (SQL) connection through SQL queries directed to one or more databases, for example, an on-premises database deployed at the call center 202, a database hosted by a remote server, a cloud based database, and/or the like accessible over one or more networks via the I/O interface 210. In another example, the call prioritization engine 220 may connect to the CAD via one or more Application Programming Interfaces (API), for example, a HyperText Transfer Protocol (HTTP) API, and/or the like.

The call prioritization engine 220 may further assign a unique identifier (ID) to each emergency event which may be used to uniquely mark and identify the event log (record) created for respective emergency event.

As shown at 106, the call prioritization engine 220 may compute an emergency event zone for the emergency event based on the event attributes retrieved and/or identified for the emergency event.

In particular, the call prioritization engine 220 may compute a location of the event zone based on the location of the emergency event location attribute extracted from the emergency call(s). The call prioritization engine 220 may further compute a polygon defining a perimeter, and/or a boundary of the event zone based on one or more of the event attributes, for example, the type of the emergency event, spread of the emergency event determined based on analysis of location of multiple reporting users 206, a spread and/or perimeter of the emergency event determined based on analysis of imagery media data received from one or more reporting client devices 204, and/or the like.

For example, assuming a certain emergency event, for example, a forest fire is reported by several users 206, for example, three users using respective client devices 204. Further assuming the three users 206 are located relatively distant from each other. In such case, the call prioritization engine 220 may compute a certain event zone for the forest fire emergency event based on the location of the client devices 204. In another example, assuming a certain emergency event, for example, a chain car accident in a certain freeway is reported by a certain user 206 using a respective client device 204. Further assuming one or more images of the accident are captured by one or more image sensors of the client device 204 and transmitted to the call prioritization engine 220. In such case, the call prioritization engine 220 may compute a certain event zone for the chain car accident based on the location of the client device 204 and further based on the images received from the client device 204.

Optionally, the call prioritization engine 220 may dynamically compute and/or adjust the event zone of one or more emergency events in real-time according to one or more parameters, conditions, and/or circumstances relating to the emergency event.

According to some embodiments, the call prioritization engine 220 may adjust the event zone of one or more emergency events according to one or more physical features identified at and/or in proximity to the event zone, for example, geographical, terrestrial, surface, structural, vegetation, artificial and/or natural landmark parameters, attributes and/or characteristics, and/or the like.

For example, assuming a car accident at a certain freeway is reported by a vehicular network connected device 204 of a certain vehicle. Further assuming the accident took place fairly close to an intersection, a freeway entrance/exit ramp, and/or the like. In such case, the call prioritization engine 220 may identify the intersection, and/or the freeway ramp, for example, based on analysis of map data relating to the certain freeway, based on analysis of image media captured by one or more image sensors of the certain vehicle, and/or the like, and may adjust the event zone of the car accident event to include the nearby intersection, the ramp, and/or the like.

In another example, assuming a land slide at a certain section of a certain cliff range is reported in one or more emergency calls by one or more users 206. Further assuming that based on analysis of map data, for example, an online topographic map of the certain cliff range, the call prioritization engine 220 identifies that the certain cliff range extends further, for example, one kilometer to the north of the reported certain section. In such case, the call prioritization engine 220 may adjust the event zone of the land slide event to also include the additional one kilometer to the north in addition to the certain section.

According to some embodiments, the call prioritization engine 220 may adjust the event zone of one or more emergency events according to one or more environmental conditions identified at the reported location of the emergency event, for example, rain, snow, fog, extreme heat, and/or the like.

For example, assuming a car accident at a certain country side road is reported in one or more emergency calls by one or more users 206. Further assuming that based on analysis of environmental conditions relating to the certain country side area extracted, for example, an online weather service, the call prioritization engine 220 determines there is heavy rain which may significantly reduce and/or degrade visibility at the certain country side area. In such case, the call prioritization engine 220 may adjust the event zone of the car accident event to extend further away from the reported location of the car accident in order to provide increased safety margins for emergency units dispatched to respond to the accident event.

In another example, assuming a fire at a certain forest area is reported in one or more emergency calls by one or more users 206. Further assuming that based on analysis of environmental conditions relating to the certain forest area, for example, based on data reported by one or more of the users 206, the call prioritization engine 220 identifies extreme heat conditions at the certain forests area. In such case, the call prioritization engine 220 may adjust the event zone of the fire event, specifically increase its size to expand and contain additional forest area which may catch fire due to the extreme heat.

According to some embodiments, the call prioritization engine 220 may adjust the event zone of one or more emergency events according to one or more timing parameters applicable at the time of the emergency event.

For example, the call prioritization engine 220 may adjust an event zone computed for a car accident which occurs at night, while visibility is low, to increase the event zone while computing and/or adjusting a reduced size event zone for a car accident which occurs during day time while visibility is high.

In another example, the call prioritization engine 220 may adjust an event zone computed for a medical emergency event at a certain public place which occurs during a weekend, while visitors traffic at the certain public place is high, to increase the event zone compared to a reduced event zone computed for a similar medical emergency event which occurs during week day while visitors traffic is significantly lower.

According to some embodiments, the call prioritization engine 220 may adjust the event zone of one or more emergency events according to one or more unrelated events and/or activities identified in proximity to a location of the event zone.

For example, assuming a public order emergency event, for example, a riot is reported at a certain urban area in one or more emergency calls by one or more users 206. Further assuming that based on analysis of the certain urban area, for example, map data, institutions database, and/or the like, the call prioritization engine 220 identifies a school in close proximity to the reported riot, in which many students are currently located. In such case, the call prioritization engine 220 may adjust the event zone of the riot and expand the event zone to include the school such that appropriate emergency units may be dispatched to the emergency event.

In another example, assuming a fire emergency event is reported at a certain country side area by one or more users 206. Further assuming that based on analysis of online scheduled events, the call prioritization engine 220 identifies that a major cycling tour currently takes place in close proximity to the location of the reported fire. In such case, the call prioritization engine 220 may adjust the event zone of the fire event to include one or more trails through which the cycling tour is planned to pass in order to prevent riders of the cycling tour from entering the event zone where they may be exposed to potential danger.

Reference is now made to FIG. 3, which is a schematic illustration of an exemplary emergency event zone computed based on event attributes extracted from one or more emergency calls, according to some embodiments.

A map of an exemplary geographical area 302 may show a plurality of geographical, natural, and/or manmade features of the geographical area 302, for example, highways (double line), local roads (single line), population areas (light grey), natural landmarks such as, for example, lakes (dark grey), and/or the like.

An exemplary event zone 304 may be computed, for example, by a call prioritization engine such as the call prioritization engine 220 for an emergency event, for example, a fire reported in one or more emergency calls initiated by one or more users such as the user 206 using client devices such as the client device 204, for example, a cellular phone.

In particular, the call prioritization engine 220 may compute the event zone 304 according to one or more event attributes of the fire event retrieved according to data extracted from the emergency call(s), as described herein before. For example, the call prioritization engine 220 may determine a location of the fire, for example, based on geolocation data received from the client device(s) 204. The call prioritization engine 220 may compute a location of the event zone 304 based on the determined location of the fire event and may further expand, adjust, and/or define borders of the event zone 304 based the retrieved event attributes of the fire event, for example, fire spread, fire intensity, and/or the like. Such event attributes may be determined, for example, based on analysis of data reported by the user(s) 206, based on analysis of media content (e.g., images, video, etc.) captured by the client device(s) 204, and/or the like.

Reference is made once again to FIG. 1.

As shown at 108, the call prioritization engine 220 may receive one or more subsequent emergency calls which may potentially relate to the same emergency event initially reported in one or more of the initial emergency calls at step 102.

Typically, the subsequent emergency call(s) may be received from one or more client devices 204 other from the client device(s) 204 from which the initial emergency call(s) were received. However, optionally, one or more of the subsequent emergency call(s) may be received from the same client device(s) 204 used for the initial emergency call(s). For example, a certain user 206 who first reports a certain emergency event may initiate an emergency call, which may be regarded as the initial emergency call. After completing the initial emergency call and hanging up, the certain user 206 may initiate one or more subsequent emergency calls to further report the same emergency event.

For brevity, each client device 204 from which a respective subsequent emergency call is received, i.e., from which the respective subsequent emergency call originates, is designated by the term another client device 204 herein after.

As shown at 110, the call prioritization engine 220 may compute one or more spatiotemporal metrics of one or more of the subsequent emergency call(s) received at 108, including at least one of the location of each another client device 204 from which a respective subsequent emergency call is received, specifically, the location of each another client device 204 with respect to the event zone of the at emergency event, and the timing of each of the subsequent emergency call(s) with respect to the emergency call(s) received at 102, specifically, the recency of each subsequent emergency call relative to previous emergency calls. Optionally, the emergency calls received at 102 may be clustered to respective event zones, and relative timings of the subsequent emergency calls may be computed with restriction to the respective cluster of calls that correspond to a respective event zone.

The call prioritization engine 220 may apply the methods, techniques and/or algorithms described herein before to determine the location of the another client device(s) 204, for example, use NLP to extract the location from speech and or text of the emergency call, receive geolocation from the another client device 204, employ triangulation, extract location from media captured by the another client device 204, and/or the like.

The call prioritization engine 220 may then compute the relative location of each another client device 204 with respect to the event zone of the emergency event, or, in case of multiple event zones, with respect to a centroid and/or likewise representative point of each event zone.

The call prioritization engine 220 may leverage the spatiotemporal metrics computed for each subsequent emergency call to select one of multiple candidate emergency events reported, e.g., based on temporal proximity (how recent it is) and/or spatial proximity (how close it is) relative to the center (in time and/or in space) of each emergency event reported in previous emergency calls.

As shown at 112, the call prioritization engine 220 may automatically generate, for each received subsequent emergency call, one or more queries according to the spatiotemporal metric(s) of the received subsequent emergency call, i.e., the relative location of the respective client device 204 and/or timing of the subsequent emergency call.

The query(s) may be directed first to determine for each of the subsequent emergency calls whether it relates to the same emergency event(s) already reported by the initial emergency calls and further to evaluate whether the respective subsequent emergency call may provide additional information which may improve data and/or understanding of the emergency event(s).

The call prioritization engine 220 may analyze the relative location of each another client device 204 and/or timing of each subsequent emergency call to evaluate whether the subsequent emergency call relates to the already reported emergency event(s). The call prioritization engine 220 may therefore further generate and/or adjust one or more of the queries according to one or more of the event attributes of the reported emergency event(s) which may be retrieved from the event log(s) (record(s)) created for the reported emergency event(s), for example, an event type, an event scale, and/or the like. In case of multiple emergency events reported and ongoing, such that a call may be relevant for two or more events and/or the event zones computed for two or more events reported are at least partially overlapping, the call prioritization engine 220 may select a prospective candidate from those events based on temporal proximity (how recent the call is) and/or spatial proximity (how close the location of the client device 204 from which the call originated is) relative to a center (in time and/or in space) of each of the events in question.

For example, assuming the location of a certain another client device 204 is relatively close, for example, 200 meters, to an event zone of an already reported wide scale fire event, the call prioritization engine 220 may estimate, and/or determine that the subsequent emergency call received from the certain another client device 204 relates to the same fire event which was already reported. In such case, the call prioritization engine 220 may generate a query comprising, for example, "are you calling to report a fire?". In another example, the call prioritization engine 220 may generate a query comprising, "are you calling to report fire victims?".

In another example, assuming the location of a certain another client device 204 is relatively close, for example, 100 meters to an event zone of an already reported small scale car accident event which occurred in a certain street. Further assuming, that based on analysis of the urban location of the certain another client device 204 with respect to the event zone of the car accident event zone, the call prioritization engine 220 estimates that the car accident cannot be seen from the location of the certain another client device 204. The call prioritization engine 220 may therefore estimate, and/or determine that the subsequent emergency call received from the certain another client device 204 does not relate to the already reported car accident event and may generate a query comprising, for example, "what is your emergency?".

In another example, assuming that a location of a close-by certain another client device 204 is in a line-of-sight to event zone of the already reported car accident event at a certain location, for example, 29th street. In such case, the call prioritization engine 220 may that the subsequent emergency call received from the certain another client device 204 relates to the already reported car accident. The call prioritization engine 220 may therefore generate a query comprising, for example, "We've identified a car accident near your area on 29th street, if you're injured or would like to talk to a 911 dispatcher, please stay on the line otherwise feel free to hang-up".

In another example, assuming that a location of another client device 204 is relatively close to both an event zone of a car accident event at a certain location on which a report had been received at a certain time, and another event zone of a domestic violence event in a near-by location reported about half an hour later than the report on the car accident event, then the call prioritization engine 220 may select the more recent event of the domestic violence as the event to which the call originating from the another client device 204 is more likely pertaining to, and generate a query comprising, for example, "are you calling regarding an incident on the corner of 29th and 32nd streets?", where the domestic violence event is associated with the street address of the crossing of the 29th and 32nd streets respectively.

Optionally, the call prioritization engine 220 may use one or more Machine Learning (ML) models, in particular generative ML models, for generating one or more queries for responding to one of more of the subsequent emergency calls. The generative ML model(s) may be trained in one or more of supervised, unsupervised, semi-supervised learning, and/or a combination thereof using a plurality of training samples.

For example, generative ML model(s) may be trained with training samples comprising queries generated by experts for responding to one or more emergency calls relating to one or more emergency events, specifically based on a relative location of the originator of the emergency calls to event zones computed for the emergency events. Such training samples may be annotated, i.e., associated with labels indicative of one or more event attributes, relative location and/or the like, for example, emergency event type, event zone attributes (e.g., size, outline, etc.), and/or the like. As such, the generative ML model(s) may evolve, learn and/or adapt to generate queries which may yield responses that may be used to effectively prioritize incoming subsequent emergency calls.

As shown at 114, the call prioritization engine 220 may respond to each of the subsequent emergency calls with the automatically generated query(s).

The call prioritization engine 220 may deliver the query(s) to each another client device 204 via one or more channels. For example, the call prioritization engine 220 may use one or more NLP tools, to convert the query(s) to speech and playback the query(s) over the phone to a user 206 using the another client device 204. In another example, the call prioritization engine 220 may transmit a text message to the another client device 204 using the phone (subscriber) number of the another client device 204. In another example, the call prioritization engine 220 may transmit a message to the another client device 204 via one or more networks, for example, the internet using one or more network communications protocols destined to an Internet Protocol (IP) address of the another client device 204 which may be received from the another client device 204 and/or resolved for the another client device 204 using one or more address resolution and/or mapping services as known in the art.

As shown at 116, the call prioritization engine 220 may prioritize the plurality of subsequent emergency calls according to a response received via the other client devices 204 from which the subsequent emergency calls are conducted.

In particular, the call prioritization engine 220 may create and/or update a queue ordering the subsequent emergency calls according to a respective priority assigned to each subsequent emergency call.

The call prioritization engine 220 may apply one or more methods, techniques, and/or algorithms to automatically analyze the response received from each another client device 204 to the respective query(s) transmitted to the respective another client device 204. For example, the call prioritization engine 220 may apply one or more NLP tools to analyze speech of one or more users 206 responding to the automatically generated queries to extract their response. In another example, the query may include a numbered menu listing optional values for one or more possible responses, for example, 1—yes, 2—no, 3—injured people, and/or the like, which may be selected by the users 206 (pressing corresponding keypad keys), and identified by the call prioritization engine 220.

While prioritization of the subsequent emergency calls may comprise ordering the subsequent emergency calls in one or more queues, the call prioritization engine 220 may optionally filter out and discard (terminate) one or more low priority subsequent emergency calls which the call prioritization engine 220 estimates are irrelevant, redundant, and/or otherwise ineffective to provide additional information relating to the emergency event.

Optionally, the call prioritization engine 220 may prioritize one or more of the subsequent emergency calls relating to the same, already reported, emergency event according to at one or more call attributes responsive to failure to receive a verbal response during the predefined time period, for example, 15 seconds, 30 seconds, 60 seconds, and/or the like. This means that in case, a respective user 206 fails to respond within the predefined time period, the call prioritization engine 220 may prioritize the subsequent emergency call initiated by the respective user 206 according to one or more non-verbal call attributes identified for the respective subsequent emergency call.

The call attributes may include, for example, sound conveyed to the call prioritization engine 220 via the another client device 204 of the non-responding user 206, image data captured by one or more image sensors of the another client device 204 of the non-responding user 206, and/or the like.

For example, after the predefined time period expires with no verbal response received from a respective user 206 holding a respective subsequent emergency call with the call center 202, the call prioritization engine 220 may start analyzing background sound heard over the another client device 204 used by respective user 206 to identify one or more sounds, noises, and/or the like which may be interpreted as event attributes and used for prioritizing the respective subsequent emergency call.

For example, assuming that based on a relative location of a respective another client device 204, used to initiate a respective subsequent emergency call, to an event zone computed for a previously reported terror emergency event, the call prioritization engine 220 estimates that the respective subsequent emergency call relates to the same terror emergency event. In case no verbal response to query(s) transmitted to the respective another client device 204 is not received within the predefined time period, the call prioritization engine 220 may start analyzing the background noise of the respective subsequent emergency call. Further assuming, that based on the sounds heard in the background of the respective subsequent emergency call, the call prioritization engine 220 estimates that gun shots were fired. In such case the call prioritization engine 220 may determine that the terror event is escalating and may extract and/or update accordingly one or more event attributes of the terror emergency event.

Optionally, the call prioritization engine 220 may use one or more trained ML models for prioritizing the subsequent emergency calls.

The ML models, for example, a Neural Network (NN), a Deep Neural Network (DNN), a classifier, a statistical classifier, a Support Vector Machine (SVM), and/or the like may be trained to classify a plurality of subsequent emergency calls initiated by a plurality of users 206 based on a response of the users 206 to queries presented to the users 206.

The ML model(s) may be trained, as known in the art, in one or more supervised, unsupervised, and/or semi-supervised training sessions using one or more training datasets comprising a plurality of training samples, annotated (labeled) or not, each mapping one or more responses to one or more queries.

For example, one or more ML models may be trained to prioritize a plurality of subsequent emergency calls relating to one or more emergency events based on whether the responses provide additional useful information (event attributes) relating to the emergency event. Such trained ML model(s) may therefore assign high priority to responses providing additional event attributes which were not previously known while assigning lower priority to responses that provide event information which was previously reported and/or is already known for the emergency event.

In another example, one or more ML models may be trained to prioritize a plurality of subsequent emergency calls relating to one or more emergency events based on a level and/or amount of details, specifically event attributes which may be extracted from each subsequent emergency call. Such trained ML model(s) may therefore assign high priority to highly detailed responses while assigning lower priority to less detailed responses.

In another example, one or more ML models may be trained to prioritize a plurality of subsequent emergency calls relating to one or more emergency events based on relevancy, and/or precision of responses to the presented queries. Such the trained ML model(s) may therefore assign high priority to responses which answer to the point, i.e., highly correspond to the information requested in the queries, while assigning lower priority to responses which are estimated irrelevant to their respective queries as they may provide unrelated, irrelevant, and potentially useless information.

One or more if the ML model(s) may be further trained to filter out false positive subsequent emergency calls which are estimated to be duplicates, redundant, significantly useless, and/or otherwise irrelevant for learning further details (event attributes) of the emergency event.

Such false positive subsequent emergency calls may be estimated to comprise useful information regarding the emergency event while in reality these subsequent emergency calls may be significantly irrelevant and provide no real useful additional information relating to the emergency event beyond what was previously reported and/or is already known for the emergency event.

For example, a certain threshold may be set for filtering out subsequent emergency calls estimated irrelevant to the emergency event. The ML model(s) may compute a priority score (value) for each subsequent emergency call based on the respective response to the query(s) and compare the computed priority score to the certain threshold. The ML model(s) may thus filter out subsequent emergency call having a priority score which is less than (does not exceed) the certain threshold. The certain threshold may be adjusted, as known in the art, based on verification and/or testing of the ML model(s), either during training and/or post deployment, to set an optimal threshold value which may efficiently filter out false positive subsequent emergency calls.

Optionally, the call prioritization engine 220 may use and/or apply a plurality of ML modes each trained for prioritizing subsequent emergency calls relating to a respective one of a plurality of emergency events. For example, a first ML model may be trained to prioritize subsequent emergency calls relating to fire emergency events based on the responses provided by the users 206 initiating the subsequent emergency calls to queries generated automatically for fire events. In another example, a second ML model may be trained to prioritize subsequent emergency calls relating to car accident emergency events based on the responses provided by the users 206 initiating the subsequent emergency calls to queries generated automatically for car accident events. In another example, a second ML model may be trained to prioritize subsequent emergency calls relating to personal medical emergency events based on the responses provided by the users 206 initiating the subsequent emergency calls to queries generated automatically for personal medical emergency events.

Optionally, the event log (record) created for the emergency event may be updated, for example, by the call prioritization engine 220, based on one or more event attributes extracted from one or more of the subsequent emergency calls which relate to the same previously reported emergency event. For example, assuming a certain event attribute extracted from one or more of the subsequent emergency calls indicates there are injuries at the emergency event site which were not previously reported by the initial emergency call(s), the call prioritization engine 220 may update the emergency event's log to indicate there are injured people at the site. In another example, assuming another event attribute extracted from one or more of the subsequent emergency calls indicates that emergency forces have arrived at the emergency site, for example, police, a medical team, and/or the like, the call prioritization engine 220 may update the emergency event's log to indicate that at least some emergency units are already located at the site to handle the emergency event.

According to some embodiments, the call prioritization engine 220 may adjust the event zone of one or more emergency events according to one or more event attributes extracted from the at least one subsequent emergency call.

For example, assuming that based on one or more emergency calls reporting a fire in a certain area, the call prioritization engine 220 computes an emergency zone encompassing the reported certain area. Further assuming, that one or more users 206 located further way from the fire zone initiate one or more subsequent emergency calls to report the fire is spreading towards other areas outside the initially computed emergency zone. In such case, the call prioritization engine 220 may dynamically adjust the fire event zone to include the other areas identified according to the updated data received in the subsequent call(s).

In another example, assuming that based on one or more emergency calls reporting a terror attack at a certain building, the call prioritization engine 220 computes an emergency zone containing the certain building. Further assuming, that one or more users 206 initiate one or more subsequent emergency calls reporting that one or more suspected terrorists exited the certain building and entered one or more other building down the same street. In such case, the call prioritization engine 220 may dynamically adjust the terror attack event zone according to the updated data received in the subsequent call(s) to also include the other reported building.

Reference is now made to FIG. 4, which is a schematic illustration of an exemplary emergency event zone dynamically adjusted based on event attributes extracted from one or more subsequent emergency calls, according to some embodiments.

Continuing the example of FIG. 3, an exemplary event zone such as the event zone 304 may be computed as described in step 106 of the process 100, for example, by a call prioritization engine such as the call prioritization engine 220 for an emergency event, for example, a fire at a certain geographical area 302 which is reported in one or more emergency calls initiated by one or more users such as the user 206 using client devices such as the client device 204, for example, a cellular phone.

However, the call prioritization engine 220 may determine, based on information extracted from one or more subsequent emergency calls reporting the fire event, that the fire has spread, and/or dispersed beyond the initially computed event zone 304. The call prioritization engine 220 may analyze one or more event attributes retrieved according to data extracted from one or more of the subsequent emergency calls and adjust the event zone 304 to encompass event zone 306 reflecting the spread of the fire. For example, call prioritization engine 220 may compute and/or adjust the event zone 306 according to the location of the another client device(s) 204 used to initiate the subsequent emergency calls for reporting the fire.

Reference is made once again to FIG. 1.

As shown at 118, after the subsequent emergency calls are prioritized, the call prioritization engine 220 may output the emergency calls prioritization, more specifically an indication of the emergency calls prioritization. For example, the call prioritization engine 220 may output one or more queues arranging the subsequent emergency calls according to their assigned priority. In another example, call prioritization engine 220 may associate each subsequent emergency call with a respective priority score which may be used to identify priority of each subsequent emergency call with respect to the other subsequent emergency call.

For example, the call prioritization engine 220 may transmit the prioritization (indication), over one or more networks, communications channels and/or the like via the I/O interface 210, to one or more automated call control systems adapted to direct incoming emergency calls to one or more dispatchers at the call center 202, human and/or automated dispatchers, who may therefore handle, respond, and/or take the subsequent emergency calls according to their priority.

In another example, the call prioritization engine 220 may transmit the prioritization (indication), via the I/O interface 210, to one or more systems, applications and/or services such as, for example, a CAD and/or the like adapted to adjust a Graphical User Interface (GUI) presented on a display of one or more terminals at the call center 202. As such, the display systems, applications and/or services may adjust the GUI according to the prioritization of the subsequent emergency calls. For example, the GUI may be adjusted to present the queue generated and/or updated by the call prioritization engine 220 to reflect the prioritization of the subsequent emergency calls and enable one or more of the dispatchers at the call center 202 to easily and efficiently identify the priority of the incoming subsequent emergency calls and handle them accordingly.

The call prioritization engine 220 may initiate one or more virtual agents to answer waiting calls in a call queue to gather information from the caller on an emergency event (i.e. event attributes such as location, type, urgency, and/or the like) and/or to triage the calls as described herein.

The call prioritization engine 220 may use real time transcription and analysis of active calls to categorize calls and/or retrieve event attributes of emergency event(s), so as to automate and expedite creation of event log for reported emergency events and/or triage of calls accordingly.

The call prioritization engine 220 may use dedicated route and/or virtual agents to handle calls received from automated devices, such as alarm systems, smartphones, smartwatches, cars, and/or the like, to offload these calls from the center and/or identify potential massive events.

The call prioritization engine 220 may use one or more audio augmentation techniques such as noise reduction, speaker diarization, cross call sound correlation, and/or the like, to enhance audio signals received via the client devices 204 and optimize extraction of data from the calls and/or response to query(s), so that creation of event log and/or triage of calls may be expedited.

The call prioritization engine 220 may use analysis of call triage flow interactions, optionally performed in real time, to extract event attributes and provide a call taker with the event information in a structured format, e.g., when the call is rerouted to a call center or PSAP to be handled by a human. Each of the call triage flow interactions may comprise an ordered sequence of automatically generated queries and responses received to the queries via a respective one of the client devices 204. The analysis may entail, for example, entity recognition of callers, summarization of the respective interaction, and/or the like. The information from the call triage flow and/or from other calls relating to the same event may be forwarded by the call prioritization engine 220 to the call taker to assist them in effectively handling the call, with as much relevant information as possible made available to them in advance.

Reference is made again to FIG. 5.

The exemplary process 500 may be utilized to further expedite triage of calls, by leveraging spatiotemporal metrics of received emergency calls, such as rate increase and/or sudden spike of calls from a same perimeter location and/or the like.

As shown at 502, the process 500 may start with the call prioritization engine 220 receiving one or more emergency calls originating from one or more client devices 204 used to report an emergency event, similarly as in 102 on the process 100.

At 504, the call prioritization engine 220 may determine the location of each client device 204 from which a respective emergency call is received, and a timing of each of the emergency calls originating from the client device(s) 204. The call prioritization engine 220 may apply one or more methods, techniques and/or algorithms to determine the location of each of the client device(s) 204, such as described herein with reference to location determination as one of event attributes retrieved at 104 on the process 100.

At 506, the call prioritization engine 220 may determine a perimeter of locations of the client devices 204 or a subset thereof, from which the emergency calls or a respective subset thereof originated at timings that meet a threshold condition. The threshold condition may be defined by default or custom settings, and may be specified in one of various forms, for example, a limit on a maximal duration of time intervals in-between calls (e.g., a number of milliseconds from one call to another), an upper bound on a duration of an overall time interval in which calls are received (e.g., a number of seconds and/or minutes in a slot or window within which calls are received), a lower bound on call rate specifying a minimum number of calls per time unit to be received for triggering the determination of such perimeter, and/or the like.

At 508, the call prioritization engine 220 may automatically generate, for each received emergency call, one or more queries according to the perimeter determined at 506. The query(s) may be directed to retrieve event attributes such as the event location, event type, event severity, event casualties, and/or the like. The automatic generation of query(s) may be performed similarly as in 112 of the process 100.

For example, if the perimeter encloses or intersects with a particular location, e.g., the client devices 204 from which the emergency calls originate are located along 29th street and/or in its vicinity, the call prioritization engine 220 may therefore generate a query comprising, for example, "are you calling to report an emergency on 29th street?".

At 510, the call prioritization engine 220 may respond to each of the emergency calls with the automatically generated query(s), similarly as done at 114 of the process 100.

At 512, the call prioritization engine 220 may retrieve one or more event attributes of the emergency event according to data extracted from the response received via the client devices 204 to the automatically generated query(s). The retrieval of event attributes from the response to the automatically generated query(s) received via the client devices 204 may be performed in a similar manner as the retrieval of event attributes from emergency calls at 104 of FIG. 1. Additionally or alternatively, the response to the automatically generated query(s) may be processed for retrieving event attributes using same and/or similar methods, techniques and/or algorithms as used in the context and/or for the purpose of call prioritization and/or triage, such as in 116 of the process 100.

At 514, the call prioritization engine 220 may compute an emergency event zone for the emergency event based on the event attributes retrieved at 512 and/or the perimeter determined at 506 for the emergency event, similarly as in 106 of the process 100.

At 516, the call prioritization engine 220 may prioritize any remaining emergency calls in a call queue and/or subsequent emergency calls received thereafter, according to responses received to one or more queries generated based on one or more spatiotemporal metrics computed with respect to the event zone and/or previous emergency calls, such as described and illustrated herein with reference to the process 100 and particularly at 108 and onwards.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms cellular device, call center, mobile device location protocols are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of prioritizing incoming emergency calls, comprising:

receiving at least one emergency call originating from at least one client device used to report at least one emergency event;

computing at least one event zone for the at least one emergency event based on at least one event attribute of the at least one emergency event retrieved according to data extracted from the at least one emergency call;

receiving at least one subsequent emergency call originating from at least one another client device;

computing at least one spatiotemporal metric for the at least one subsequent emergency call selected from the group consisting of:

a location of the at least one another client device with respect to the at least one event zone of the at least one emergency event; and a timing of the at least one subsequent emergency call with respect to the at least one emergency call;

responding to the at least one subsequent emergency call with at least one query generated automatically according to the at least one spatiotemporal metric; and prioritizing the at least one subsequent emergency call in a call queue according to a response received via the at least one another client device to the at least one query;

wherein when said at least one emergency call is automatically initiated by at least one automated device automatically placing an emergency call upon automatic detection of a triggering event, directing said automatically initiated at least one emergency call to at least one dedicated route, upon reception of said automatically initiated at least one emergency call.

2. The computer implemented method of claim 1, further comprising:

determining a location of the at least one client device;

determining a timing of the at least one emergency call;

determining a perimeter of the location of one or more of the at least one client device for which the timing of one or more of the at least one emergency call that originated therefrom meets a threshold condition; and computing the at least one event zone according to the perimeter.

3. The computer implemented method of claim 2, further comprising responding to the at least one emergency call with at least one another query generated automatically according to the perimeter, and retrieving the at least one event attribute and/or adjusting the perimeter according to a response received via the at least one client device to the at least one another query.

4. The computer implemented method of claim 1, further comprising responding to the at least one subsequent emergency call in the call queue by at least one virtual agent.

5. The computer implemented method of claim 1, further comprising automatically transcribing the at least one emergency call and/or at least one subsequent emergency call in real time and applying on the transcription of the at least one emergency call and/or the at least one subsequent emergency call at least one machine learning model to retrieve and cast emergency event information and/or caller identification into a structured format.

6. The computer implemented method of claim 1, further comprising applying at least one audio augmentation technique to the at least one emergency call and/or the at least one subsequent emergency call.

7. The computer implemented method of claim 1, further comprising analyzing an interaction flow of the at least one subsequent emergency call comprising the at least one query and the response received thereto via the at least one another client device for extracting at least one another event attribute of the at least one emergency event, and responsive to a call taker answering the at least one subsequent emergency call providing the call taker with the at least one another event attribute.

8. The computer implemented method of claim 1, further comprising dynamically adjusting the at least one event zone according to at least one event attribute retrieved according to data extracted from the at least one subsequent emergency call.

9. The computer implemented method of claim 1, further comprising adjusting the at least one event zone according to a member selected from the group consisting of: at least one physical feature identified at and/or in proximity to the at least one event zone; at least one environmental condition; at least one timing parameter; at least one unrelated event and/or activity identified in proximity to a location of the at least one event zone.

10. The computer implemented method of claim 1, further comprising adjusting the at least one query based on the at least one event attribute of the at least one emergency event.

11. The computer implemented method of claim 1, further comprising using at least one generative machine learning model for generating the at least one query.

12. The computer implemented method of claim 1, further comprising prioritizing the at least one subsequent emergency call according to at least one call attribute responsive to failure to receive a verbal response during a predefined time period.

13. The computer implemented method of claim 1, wherein the prioritization of the subsequent emergency calls is conducted using at least one trained machine learning model.

14. The computer implemented method of claim 13, wherein the at least one trained machine learning model is further trained to filter out false positive emergency calls irrelevant to the at least one emergency event.

15. The computer implemented method of claim 13, further comprising using a plurality of machine learning models each trained for prioritizing emergency calls relating to a respective one of a plurality of emergency events.

16. The computer implemented method of claim 1, further comprising adjusting a graphical user interface (GUI) presented on a display of at least one call center terminal according to the prioritization.

17. The computer implemented method of claim 1, wherein each of the at least one emergency call and/or the at least one subsequent emergency call is initiated by a user or an automated device.

18. The computer implemented method of claim 16, wherein emergency calls from automated devices are automatically handled by at least one virtual agent.

19. The computer implemented method of claim 1, wherein the at least one event attribute is stored in an event log created for the at least one emergency event based on the at least one emergency call.

20. The computer implemented method of claim 19, further comprising updating the event log based on the at least one subsequent emergency call.

21. A system for prioritizing incoming emergency calls, comprising:

at least one processor configured to execute a code, the code comprising:

code instructions to receive at least one emergency call originating from at least one client device used to report at least one emergency event;

code instructions to compute at least one event zone for the at least one emergency event based on at least one event attribute of the at least one emergency event retrieved according to data extracted from the at least one emergency call;

code instructions to receive at least one subsequent emergency call originating from at least one another client device;

code instructions to compute at least one spatiotemporal metric for the at least one subsequent emergency call selected from the group consisting of:

a location of the at least one another client device with respect to the at least one event zone of the at least one emergency event; and a timing of the at least one subsequent emergency call with respect to the at least one emergency call;

code instructions to respond to the at least one subsequent emergency call with at least one query generated automatically according to the at least one spatiotemporal metric; and code instructions to prioritize the at least one subsequent emergency call in a call queue according to a response received via the at least one another client device to the at least one query;

wherein when said at least one emergency call is automatically initiated by at least one automated device automatically placing an emergency call upon automatic detection of a triggering event, directing said automatically initiated at least one emergency call to at least one dedicated route, upon reception of said automatically initiated at least one emergency call.

* * * * *